(12) United States Patent
Burkhart et al.

(10) Patent No.: US 9,984,381 B2
(45) Date of Patent: May 29, 2018

(54) MANAGING CUSTOMER INTERACTIONS WITH A PRODUCT BEING PRESENTED AT A PHYSICAL LOCATION (71) Applicant: INTERNATIONAL BUSINESS MACHINES CORPORATION, Armonk, NY (US)

(72) Inventors: Michael J. Burkhart, Round Rock, TX (US); Michael P. Carlson, Austin, TX (US); Theodore J. L. Shrader, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 14/574,770

(22) Filed: Dec. 18, 2014

(65) Prior Publication Data

US 2016/0180363 A1 Jun. 23, 2016

(51) Int. Cl.
*G06Q 30/02* (2012.01)
*G06Q 30/06* (2012.01)
*G06K 7/10* (2006.01)
*G06K 19/07* (2006.01)

(52) U.S. Cl.
CPC ..... *G06Q 30/0207* (2013.01); *G06K 7/10009* (2013.01); *G06K 19/0716* (2013.01); *G06K 19/0723* (2013.01); *G06Q 30/0601* (2013.01); *G06Q 30/0224* (2013.01)

(58) Field of Classification Search
CPC .................................................. G06Q 30/02
See application file for complete search history.

(56) References Cited

U.S. PATENT DOCUMENTS

| 8,566,170 B1* | 10/2013 | Joseph ............... G06Q 30/0207 705/14.1 |
| 2002/0133381 A1 | 9/2002 | Tso |
| 2002/0161651 A1 | 10/2002 | Godsey et al. |
| 2008/0189170 A1 | 8/2008 | Ramachandra |
| 2008/0249851 A1* | 10/2008 | Angell ................. G06Q 30/02 705/14.52 |

(Continued)

OTHER PUBLICATIONS

"Passive RFID Basics", by Pete Sorrells. Microchip Technology Inc., Microchip AN680. pp. 1-4. 1998.*

(Continued)

*Primary Examiner* — William A Brandenburg
(74) *Attorney, Agent, or Firm* — Law Office of Jim Boice (57) ABSTRACT A system detects and manages customer interactions with a product being presented at a physical location. A customer tracking device detects a customer within a predefined distance of a product during a first time period. A product motion sensor detects a movement of the product while the customer is within the predefined distance of the product during the first time period. One or more processors identify and record a first price of the product during the first time period. The customer tracking device further detects the customer within the predefined distance of the product during a second time period. One or more processors further determine a second price of the product during the second time period, and then determine a lower price of the product by comparing the first price with the second price. A price transmitter transmits the lower price to the customer during the second time period.

16 Claims, 7 Drawing Sheets (56) References Cited

U.S. PATENT DOCUMENTS

| | | |
|---|---|---|
| 2010/0235218 A1 | 9/2010 | Erhart et al. |
| 2011/0012713 A1* | 1/2011 | Wilkinson ......... G06K 7/10178 340/10.3 |
| 2011/0029364 A1 | 2/2011 | Roeding et al. |
| 2013/0242704 A1* | 9/2013 | Strat ................ G06K 19/07749 367/137 |

OTHER PUBLICATIONS

"Design and fabrication of ultra-low cost radiofrequency identification antennas and tags exploiting paper substrates and inkjet printing technology", Orechnii et al. IET Microw. Antennas Propag., 2011, vol. 5, Iss. 8, pp. 993-1001. (Year: 2011).*

"Design and Development of Novel Radio Frequency Identification (RFID) Tag Structures", Li Yang. Dissertation. Georgia Institute of Technology, Dec. 2009, pp. 13-37. (Year: 2009).*

Anonymous, "About Shopkick", shopkick, inc., www.shopkick.com, retrieved Dec. 18, 2014, pp. 1-3.

\* cited by examiner

MANAGING CUSTOMER INTERACTIONS WITH A PRODUCT BEING PRESENTED AT A PHYSICAL LOCATION

BACKGROUND

The present disclosure relates to the field of product management, and specifically to pricing of products. Still more particularly, the present disclosure relates to pricing products according to customer interactions with products.

SUMMARY

In an embodiment of the present invention, a system detects and manages customer interactions with a product being presented at a physical location. A customer tracking device detects a customer within a predefined distance of a product during a first time period. A product motion sensor detects a movement of the product while the customer is within the predefined distance of the product during the first time period. One or more processors record a first price of the product during the first time period. The customer tracking device further detects the customer within the predefined distance of a product during a second time period, wherein the second time period and the first time period are separated by a predefined amount of time. One or more processors further determine a second price of the product during the second time period. One or more processors further determine a lower price of the product by comparing the first price with the second price. A price transmitter transmits the lower price to the customer while the customer is within the predefined distance of the product during the second time period.

In an embodiment of the present invention, a method detects and manages customer interactions with a product being presented at a physical location. A customer tracking device detects a customer within a predefined distance of a product during a first time period. A product motion sensor detects a movement of the product while the customer is within the predefined distance of the product during the first time period. One or more processors record a first price of the product during the first time period. The customer tracking device detects the customer within the predefined distance of a product during a second time period, where the second time period and the first time period are separated by a predefined amount of time. The one or more processors identify a second price of the product during the second time period. One or more processors determine a lower price of the product by comparing the first price with the second price. A price transmitter transmits the lower price to the customer while the customer is within the predefined distance of the product during the second time period.

In an embodiment of the present invention, a computer program product detects and manages customer interactions with a product being presented at a physical location. The computer program product comprises a computer readable storage medium having program code embodied therewith. The computer readable storage medium is not a transitory signal per se, and the program code is readable and executable by a processor to perform a method comprising: receiving, from customer tracking device, a message indicating that a customer is within a predefined distance of a product during a first time period; receiving, from a product motion sensor, a message describing a movement of the product while the customer is within the predefined distance of the product during the first time period; recording a first price of the product during the first time period; receiving, from the customer tracking device, a message indicating that the customer is within the predefined distance of a product during a second time period, wherein the second time period and the first time period are separated by a predefined amount of time; identifying a second price of the product during the second time period; determining a lower price of the product by comparing the first price with the second price; and presenting, to a price transmitter, the lower price, wherein the price transmitter transmits the lower price to the customer while the customer is within the predefined distance of the product during the second time period.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1:
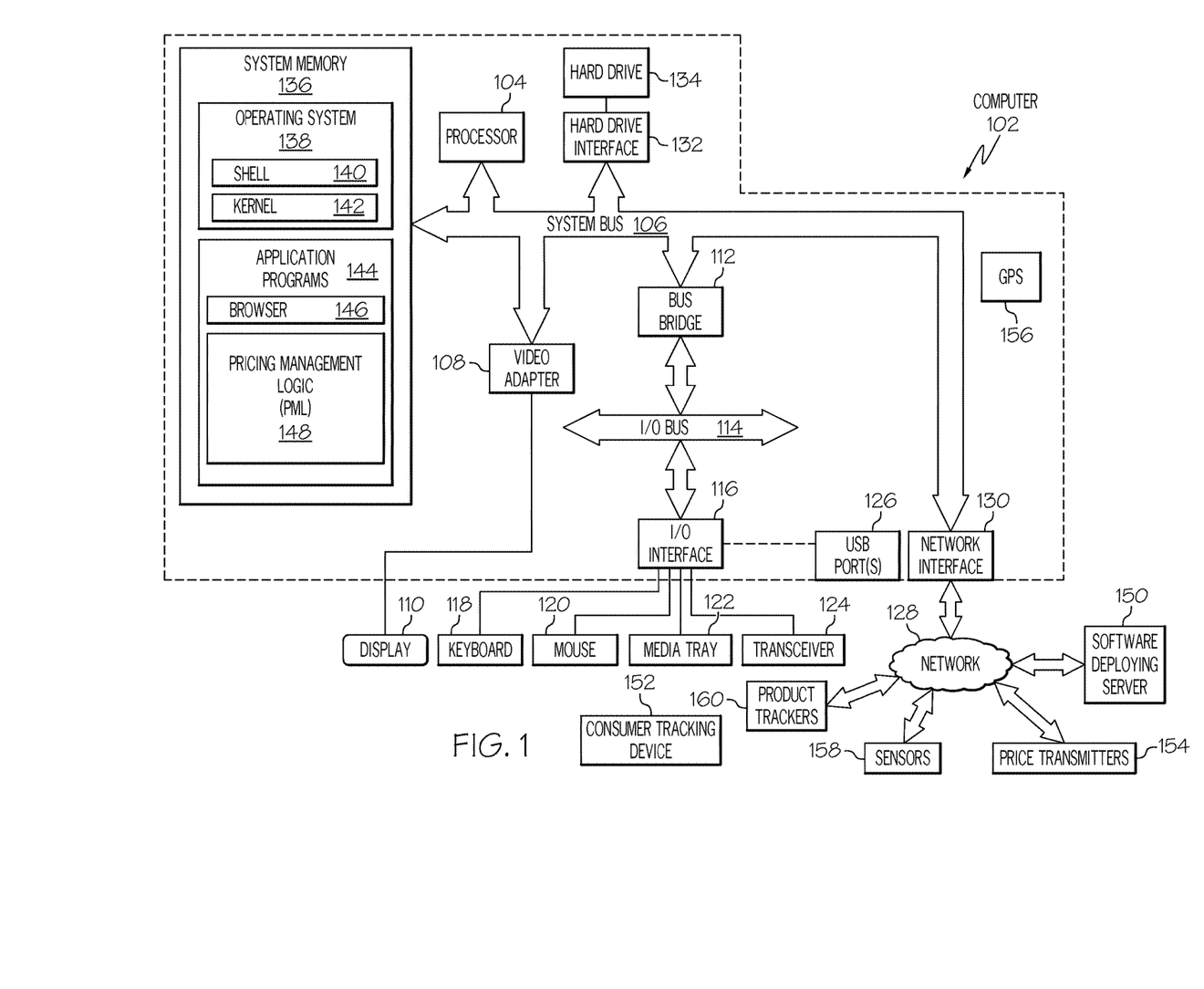
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or consumer tracking device 152 and/or price transmitters 154 and/or product trackers 160 in FIG. 1 and/or a customer identification transmitter 206 in FIG. 2, as well as these devices' equivalents in one or more other figures presented herein.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a transceiver 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a pricing management logic (PML) 148. PML 148 includes code for implementing the processes described below, including those described in FIGS. 2-8. In one embodiment, computer 102 is able to download PML 148 from software deploying server 150, including in an on-demand basis, wherein the code in PML 148 is not downloaded until needed for execution. Note further that, in one embodiment of the present invention, software deploying server 150 performs all of the functions associated with the present invention (including execution of PML 148), thus freeing computer 102 from having to use its own internal computing resources to execute PML 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
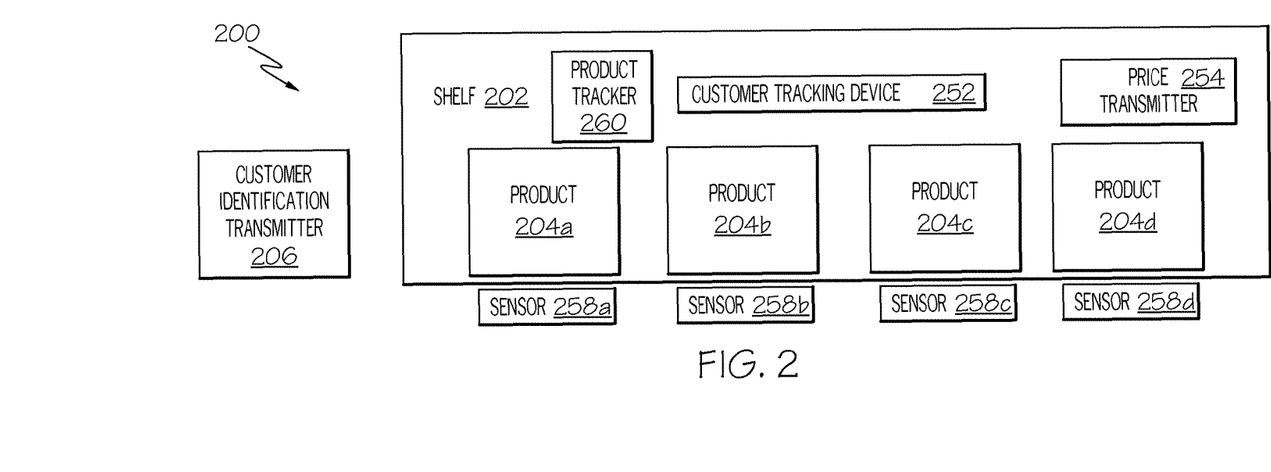
FIG. 2 illustrates an exemplary physical environment in which one or more embodiments of the present invention may be implemented, in which sensors for detecting physical movement of products are mounted on shelving.

With reference now to FIG. 2, an exemplary physical environment in which one or more embodiments of the present invention may be implemented is presented. In the physical environment 200 depicted in FIG. 2, sensors 258a-258d, used to detect the physical movement of products 204a-204d, are mounted on a shelf 202.

Assume in physical environment 200 that shelf 202 holds multiple products 204a-204d (where "d" is an integer). Products 204a-204d may be any objects that are offered to customers, such as electronic devices, clothing, appliances, etc. In accordance with an exemplary scenario for one or more embodiments of the present invention, customers will pick up and examine one or more of the products 204a-204d (which may be a same product or different products). Too often, such consumers will then leave the physical environment (e.g., a "sticks-and-bricks" store) and purchase the examined product online, in an effort to save money. The present invention provides an incentive to the customer to purchase the product at the store instead.

In FIG. 2, each product 204a is monitored by one or more sensors 258a-258d (analogous to sensors 158 in FIG. 1). Each of the sensors 258a-258d may be dedicated to a particular product from products 204a-204d, or one of the sensors 258a-258d may monitor some or all of the products 204a-204d.

In an embodiment of the present invention, one or more of the sensors 258a-258d are product movement sensors, and more specifically optical sensors. Each optical sensor includes an optical transmitter (not shown) and an optical receiver (also not shown). For example, assume that an optical transmitter (a directional light source such as an infrared transmitter) is positioned below product 204a and an optical receiver (e.g., a light sensor such as a photodiode) is positioned above product 204a. Initially, product 204a blocks any light from the optical transmitter reaching the optical receiver. However, when the product 204a is picked up by a customer, product 204a is no longer between the optical transmitter and the optical receiver, thus clearing an optical pathway between the optical transmitter and the optical receiver. This causes the optical receiver to generate a signal indicating that the product 204a has been physically moved.

In an embodiment of the present invention, one or more of the sensors 258a-258d are weight scales that detect pressure exerted by one or more of the products 204a-204d when placed atop the weight scales. For example, assume that sensor 258a is a weight scale, and that product 204a is resting atop this weight scale. When the customer picks up product 204a to examine it, the weight scale detects the new weight reading (i.e., zero if only one product was resting on the weight scale; some reduced weight reading if more than one product was initially resting on the weight scale), thereby generating a signal indicating that the product has been picked up by the customer.

As depicted in FIG. 2, a customer tracking device 252, which in one or more embodiments is physically located next to the products 204a-204d, is able to interrogate a customer identification transmitter 206, in order to identify which customer is handling one or more of the products 204a-204d. More specifically, the customer tracking device 252 is able to detect when a particular customer is within a predefined distance of one or more of the products 204a-204d, both at an initial time ("during a first time period") and at a subsequent time ("during a second time period"). As described in further detail herein, one or more embodiments of the present invention are directed to adjusting a price of a product in response to a customer handling the product, and then returning at a later time/date to handle the same (or similar) product again. Thus, customer tracking device 252 detects when a particular customer is near a particular product.

Various embodiments use various systems to identify a particular customer.

For example, customer identification transmitter 206 may be a short-range transmitter that is part of a "smart" phone. The short-range transmitter transmits, either continuously or in response to an interrogation signal from a transmitter that is part of the customer tracking device 252, a unique identification signal for that customer. As long as a particular customer's smart phone is within signal range of the customer tracking device 252, the system will know that this particular customer is the customer who is handling the product (assuming that no other customers are detected in this area).

The signal being transmitted by the transmitter in the customer tracking device 252 may be a short-range signal (e.g., a network that conforms to the IEEE 802.15.1 standard, and having a range of less than 10 meters), or a medium range signal (e.g., Wi-Fi) that has a range of 40-50 meters. Since such signals have a limited range, then they are able to determine now only if a particular customer is within the store, but also what department the customer is in. That is, if a customer tracking device 252 is physically within an automotive department in a store, and the radius/range of the signal transmitter in the customer tracking device 252 is limited to the area of the automotive department, then the customer tracking device 252 is able to determine which particular customers are in the automotive department at any particular time based on the customer identification transmitter 206 being able to respond over the short-range network (e.g., the Wi-Fi network).

In another embodiment, customer tracking device 252 is a facial recognition device, which captures (in real time) a digital image of the customer's face when the customer is near a particular product, assigns reference points on the digital image of the customer's face, and then compares these reference points with a database of known persons. In one embodiment of the present invention, in order to accelerate the process of identifying the customer, each customer entering the store presents a shopper identification card, thus reducing the size of the database of digital images that must be compared against.

Once the identity of the customer is identified, then one or more of the sensors 258a-258d are able to detect a movement of one or more of the products 204a-204d while the customer is within the predefined distance of one or more of the products 204a-204d.

Depicted in FIG. 2 is a product tracker 260. One feature of product tracker 260 is to maintain, either locally or from a remote database, a pricing history of each of the products 204a-204d. For example, the product tracker 260 keeps a record not only of the present price of one or more of the products 204a-204d, but also a record of a past and/or scheduled/predicted prices of one or more of products 204a-204d. In one or more embodiments, the product tracker 260 is able to keep track of past, present, and predicted future prices of one or more of the products 204a-204d for particular customers (e.g., based on their history of handling one or more of the products 204a-204d).

Product tracker 260 is also able to receive signals from sensors 258a-258d, thus identifying when particular products from products 204a-204d are being handled (and by which particular customer, by integrating information from the customer tracking device 252 with the signals from the sensors 258a-258d).

Thus, if a particular customer (as identified customer tracking device 252 in conjunction with customer identification transmitter 206) handles one or more of the products 204a-204d, and then returns at a later time/date to where the products 204a-204d are located, a price transmitter 254 will send an adjusted price for the product to this particular customer.

In one embodiment of the present invention, the adjusted price for a particular product is sent only in response to the customer returning (after a predetermined amount of time, such as 10 minutes, the next week, etc.) to the area where the products 204a-204d are displayed.

In one embodiment of the present invention, the adjusted price for a particular product is sent only in response to the customer returning to the area where the products 204a-204d are displayed after a predetermined amount of time, and in response to one or more of the sensors 258a-258d detecting that the particular product is again being handled/examined by the customer.

In one embodiment of the present invention, the price transmitter 254 transmits the adjusted price to the customer's cell phone, etc. In another embodiment, a local display (not shown) in communication with price transmitter 254 will present the lower price to the customer by name, optionally for a limited amount of time. For example, a video display may display the message "Customer A, product 204a is available to you only for X dollars. This offer is valid for the next hour." Alternatively, the price transmitter 254 has audio capability, such that this message is presented, either with a video message or alone, via a speaker.

Figure 3:
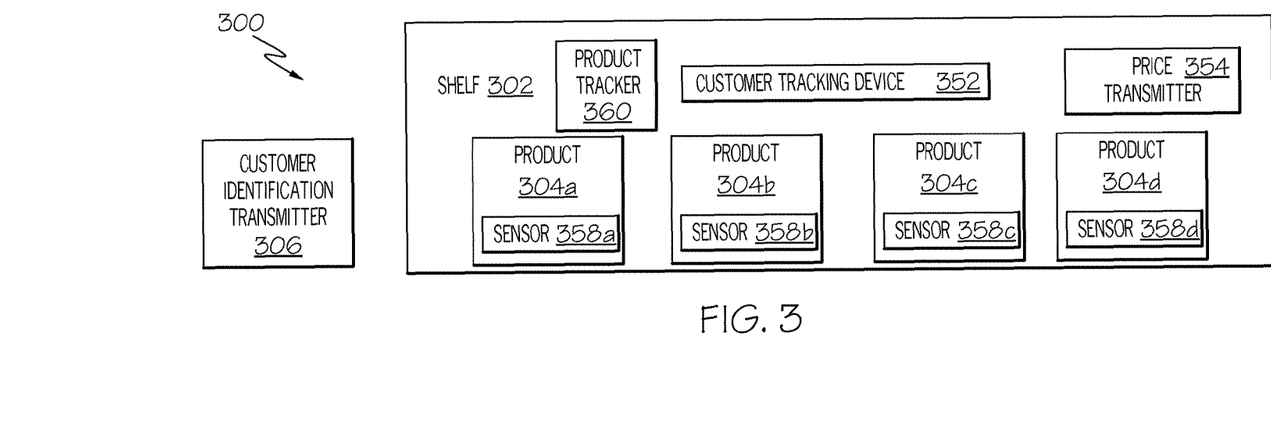
FIG. 3 depicts an exemplary physical environment in which one or more embodiments of the present invention may be implemented, in which sensors for detecting physical movement of products are mounted on the products themselves.

With reference now to FIG. 3, an exemplary physical environment 300 in which sensors 358a-358d for detecting physical movement of products 304a-304d (similar to products 204a-204d in FIG. 2) are mounted on the products 304a-304d themselves is presented. In a manner similar to that depicted in FIG. 2 for products 204a-204d, products 304a-304d are on a shelf 302. A customer tracking device 352 (similar to customer tracking device 252 in FIG. 2) detects/tracks the proximity of a customer by his/her customer identification transmitter 306 (similar to customer identification transmitter 206 in FIG. 2). In a manner similar to that described in FIG. 2, a product tracker 360 tracks the price of and interactions with products 304a-304d, while price transmitter 354 transmits adjusts prices to specific customers.

In FIG. 3, sensors 358a-358d are directly mounted on the products 304a-304d. Signals from sensors 358a-358d are sent to the product tracker 360, which incorporates information derived by the customer tracking device 352 and the customer identification transmitter 306 to determine which customers are/have been handling certain products.

In an embodiment of the present invention, sensors 358a-358d are motion detectors that utilize accelerometers to detect a movement of one or more of the products 304a-304d. Various electronic devices can be used to detect acceleration movement in one or more axis, including piezoelectric, piezoresistive, and capacitive components that convert mechanical motion into electrical signals. In one embodiment the accelerometer used by one or more of the sensors 358a-358d incorporates micro electro-mechanical systems (MEMS), which measure deflection of a microlever that is counter-weighted with a known mass. In one or more embodiments, multiple accelerometers are incorporated into sensors 358a-358d in order to capture movement in all three planes of three dimensional space.

Figure 4:
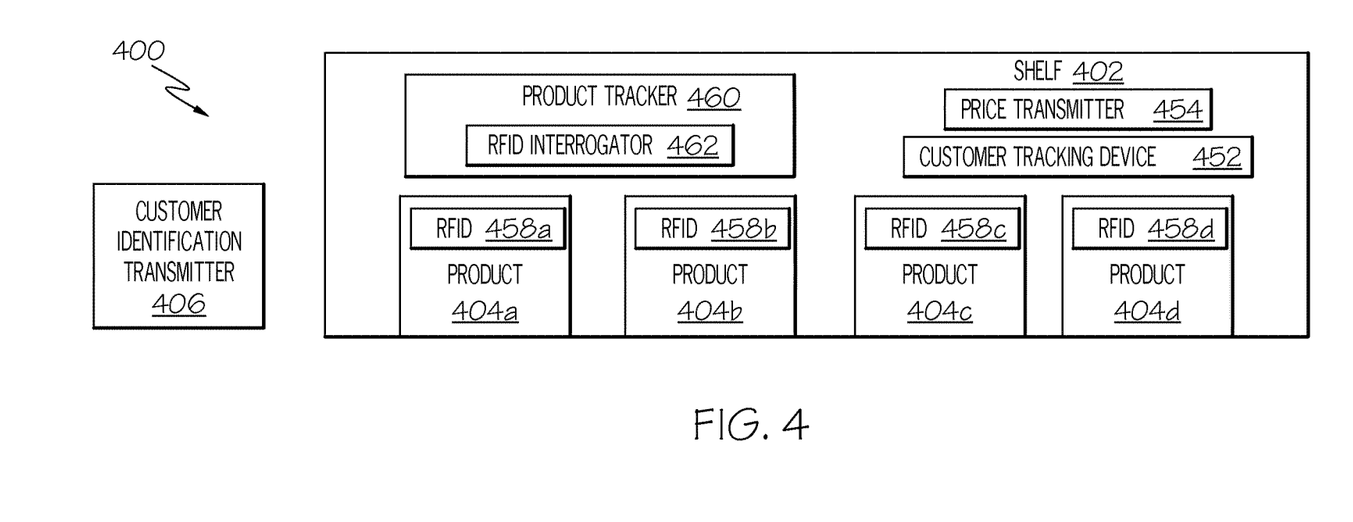
FIG. 4 illustrates an exemplary physical environment in which one or more embodiments of the present invention may be implemented, in which sensors utilize radio frequency identifier (RFIDs) mounted on the products.

In an embodiment of the present invention depicted in FIG. 4, the sensors attached to each product are radio frequency identifiers (RFIDs), shown as RFIDs 458a-458d. As in FIG. 2, the exemplary physical environment 400 depicts products 404a-404d (similar to products 204a-204d in FIG. 2) positioned on a shelf 402. A customer tracking device 452 (similar to customer tracking device 252 in FIG. 2) detects/tracks the proximity of a customer by his/her customer identification transmitter 406 (similar to customer identification transmitter 206 in FIG. 2). In a manner similar to that describe in FIG. 2, a product tracker 460 tracks the price of and interactions with products 404a-404d, while price transmitter 454 transmits adjusted prices to specific customers.

Note that product tracker 460 incorporates an RFID interrogator 462, which obtains two pieces of information from RFIDs 458a-458d. The first information is the identity of a particular product from products 404a-404d. This information is in the form of a simple binary code that is sent back from the RFIDs 458a-458d. The second information from the RFIDs 458a-458d is a description of how many times a product from products 404a-404d has been moved/handled.

Figure 5:
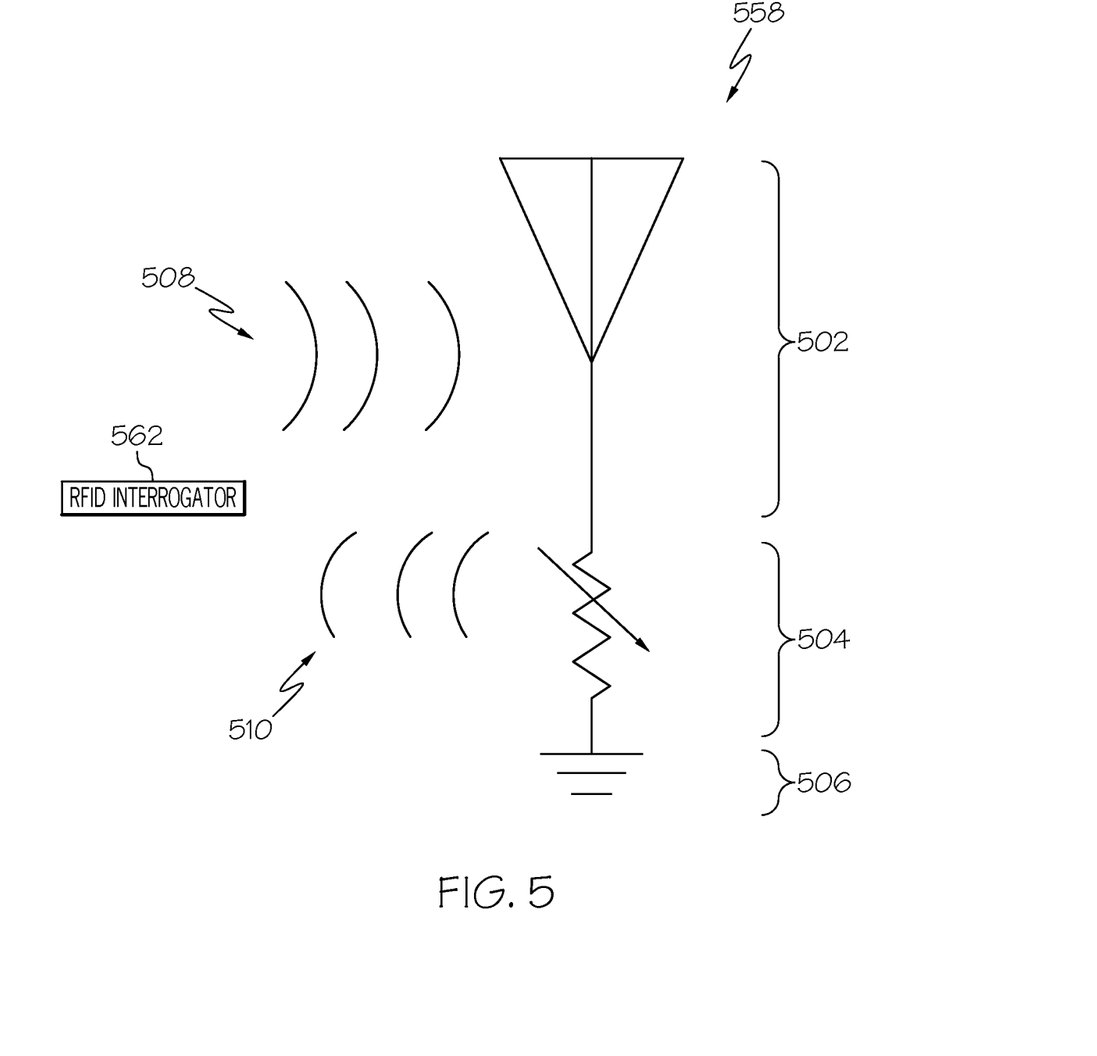
FIG. 5 depicts an exemplary novel backscatter passive RFID used in one or more embodiments of the present invention.

With reference now to FIG. 5, a schematic for an exemplary and novel backscatter passive RFID 558, as used by RFIDs 458a-458d in FIG. 4, is presented.

As just noted and in one or more embodiments of the present invention, RFID 558 is a backscatter passive RFID. Operation of RFID 558 is as follows.

In order to obtain identification information from RFID 558, an RFID interrogator 562 (similar to the RFID interrogator 462 in FIG. 4) sends an interrogation signal 508 to the RFID 558. RFID 558 may be a chip RFID or a chipless RFID. If RFID 558 is a chip device, then a small memory chip (not shown) contains digital identification information, which is then transmitted by the RFID 558 back to the RFID interrogator 562 in the form of reactive signals 510. If RFID 558 is a chipless device, then the physical shape of the RFID 558 manipulates the reactive signals 510. That is, in a chipless RFID, the RFID 558 "bounces back" the interrogation signal 508 in a unique manner (i.e., in different directions, amplitude, etc.) based on the physical shape of the chipless RFID. This reflected ("bounced back") signal, also known as "backscatter", is decoded by the RFID interrogator 562 in order to derive information about the identity of a particular product, and, as described below, how many times the particular product has been handled by a particular customer.

One feature of a backscatter RFID is that the amplitude of reactive signals 510, relative to the amplitude of the interrogation signal 508, is a function of how much resistance is encountered by the backscatter RFID when going to ground 506 (i.e., an electron source/sink, which can be provided by packaging of the products 404a-404d, contact with shelf 402, etc.). That is, the greater the electrical resistance between the antenna 502 and a variable resistor 504 in the RFID 558 in FIG. 5, the lower the amplitude of the reactive signals 510, since the greater electrical resistance reduces the amount of amperage going to ground, thereby resulting in weaker electromagnetic wave generation by the antenna 502. One or more embodiments of the present invention utilize this property of backscatter RFIDs to determine, in a novel and innovative manner, how much a product has been moved/handled.

Figure 6:
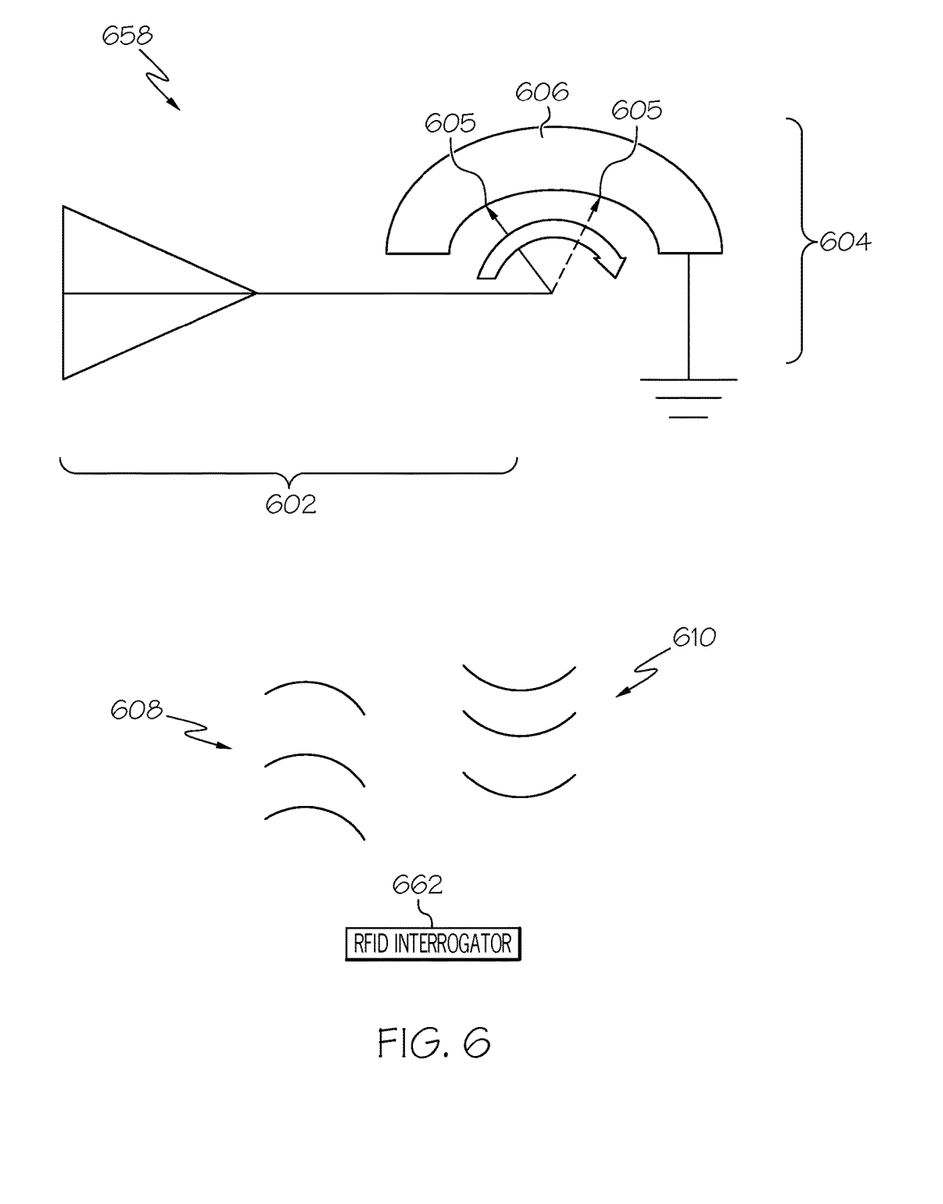
FIG. 6 illustrates a novel backscatter passive RFID that utilizes a sliding contact for changing a resistance in the RFID.

For example, consider the RFID 658 in FIG. 6 (similar to one or more of the RFIDs 458a-458d shown in FIG. 4). RFID 658 comports with the schematic shown in FIG. 5. As described in the description of FIG. 5 for RFID 558, an RFID interrogator 662 (similar to the RFID interrogator 562 in FIG. 5) sends out interrogation signals 608 to RFID 658, which responds with reactive signals 610. Reactive signals 610 include identification information about the RFID 658 (and thus the product to which the RFID 658 is attached), as well as information about how much the product has been moved/examined.

As shown in FIG. 6, RFID 658 includes an antenna 602 (similar to the antenna 502 shown in the schematic in FIG. 5), and a variable resistor 604 between the antenna 602 and ground. The variable resistor 604 is made up of a weighted object 605 and a conductor 606, to which the weighted object 605 is in variable physical contact. That is, the weighted object 605 moves in response to the product moving. For example, as depicted in FIG. 6, weighted object 605 is an articulated lever, whose center of gravity is weighted towards the arrow head depicted. Thus, when the RFID 658 moves in a certain direction (e.g., to the left in FIG. 6), the weighted object 605 (arrow) will rotate in the opposing direction (e.g., to the right).

In FIG. 6, the movement of the weighted object 605 to the position shown by the dashed line changes the resistance offered by conductor 606. Initially the weighted object 605 makes contact with the conductor 606 at the position shown by the solid line that depicts weighted object 605, such that current from the antenna 602 must flow through most of the conductor 606 in order to reach ground. Movement of the product to which the RFID 658 is attached to the left causes the weighted object 605 to move to the right, thereby changing the position at which the weighted object 605 contacts the conductor 606.

Thus, in the example shown in FIG. 6, initial contact between the weighted object 605 and the conductor 606 is at a first position (indicated by the solid arrow), which causes current to travel through most of the conductor 606, resulting in a high internal resistance for the variable resistor 604. Moving the product to which the RFID 658 is attached to the left causes the weighted object 605 to move to the right, thus, making contact between the weighted object 605 and the conductor 606 at the second position (indicated by the dashed arrow), thereby resulting in a lower internal resistance for the variable resistor 604, due to current having to pass through less of the conductor 606 than when the weighted object 605 was at the first (solid line) position. This reduction in resistance in the variable resistor 604 increases the amplitude of the subsequent backscatter signals (reactive signals 610). This increase in amplitude of the reactive signals 610 is interpreted by the product tracker 460 in FIG. 4 as being caused by movement of the product (e.g., product 404a in FIG. 4).

Each time the product 404a is moved, the weighted object 605 moves a bit more to the right in the example shown in FIG. 6. In a preferred embodiment of the present invention, the weighted object 605 is in unidirectional slidable contact with the conductor 606. That is, the weighted object 605 is able to slide across the surface of the conductor 606 in one direction (e.g., to the right), but movement of the weighted object 605 in the opposite direction (e.g., to the left) is prevented by sawtooth ridges (not shown) that prevent such movement. Thus, each decrease in the resistance in the variable resistor 604 indicates additional movement of the product to which the RFID 658 is affixed.

If the resistance in the variable resistor 604 reaches a predetermined level (as identified by product tracker 460) for a particular customer (who was in the area when the product was moved/handled), a price for that product is adjusted for that particular customer. That is, the total amount of resistance to the variable resistor 604 is interpreted by the RFID interrogator 462 and/or product tracker 460 in FIG. 4 as a specific number of times that a particular customer has picked up and examined a particular product. When this number of times is reached, the price transmitter 454 will offer that particular customer (e.g., that particular customer only) the product (e.g., product 404a) at a reduced price.

While only a single variable resistor 604 is depicted in FIG. 6, in one or more embodiments multiple variable resistors are incorporated into the RFID 658, in order to detect acceleration movement in all axes of three dimensional space.

Figure 7:
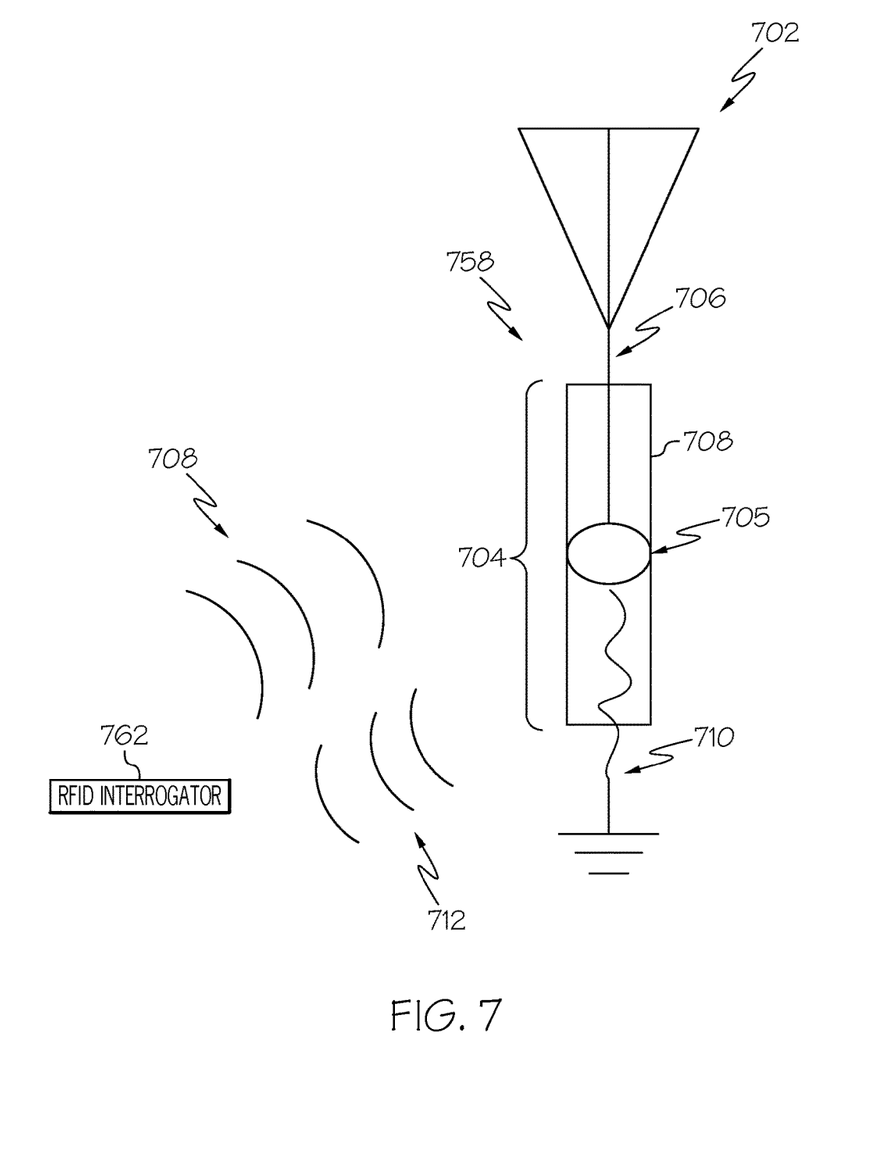
FIG. 7 depicts a novel backscatter passive RFID that utilizes a weighted object to change the length and resistance of an antenna in the RFID.

In an embodiment of the present invention, the RFID 558 depicted in FIG. 5 utilizes the variable resistor 704 depicted in FIG. 7. As shown in FIG. 7, an RFID 758 includes an antenna head 702, to which a first antenna wire 706 is connected. The RFID interrogator 762 sends out interrogation signals 708 to the RFID 758. A weighted object 705 is connected to the first antenna wire 706 that connects to the antenna head 702. The first antenna wire 706 is stretchable but irreversible. That is, the first antenna wire 706 can be stretched to a longer length (thus reducing its cross-section and increasing its resistance) when pulled by weighted object 705 being forced downward. However, if weighted object 705 subsequently moves upward, the first antenna wire 706 retains its new longer length and smaller cross-section. Thus, the amount of wire elongation and incurred cross-section reduction to the first antenna wire 706 is cumulative, such that this cumulative wire elongation can be interpreted as the total number of times that a product has been physically handled. In an embodiment of the present invention, movement of the weighted object 705 is confined to the interior of a sleeve 708, in order to focus and direct the elongation of the first antenna wire 706. In order to measure movement through all three axes of three-dimensional space, at least two other variable resistors (note shown) are incorporated at orthogonal orientations within the RFID 758.

As further shown in FIG. 7, a second antenna wire 710 connects the weighted object 705 to ground. Thus, as described herein, movement of the product (to which the RFID 758 is affixed) causes the weighted object 705 to stretch the first antenna wire 706, thereby increasing the resistance in the first antenna wire 706 (as a result of the reduction in the cross-sectional area of the first antenna wire 706). Increasing the resistance in the first antenna wire 706 causes a different amplitude of the subsequent backscatter signal 712, in a similar manner as that described for the RFID 658 in FIG. 6. However, in the embodiment depicted in FIG. 7, lengthening the first antenna wire 706 increases the resistance between the antenna head 702 and ground, resulting in decreases current flow through the antennas in RFID 758, and thus a reduction in the amplitude of the subsequent backscatter signal 712. This change in the subsequent backscatter signal 712 is interpreted by the RFID interrogator 762 and/or the product tracker 460 in FIG. 4 as a being the result of a specific quantity of times that the product has been picked up and examined by a particular customer.

Thus, by using novel variable resistors as described in FIG. 6 or FIG. 7 or some other type of variable resistor (not depicted) that reacts to movement, product movement and movement quantification is ascertained by the described RFID devices. An RFID interrogator (e.g., RFID interrogator 462 in FIG. 4) receives an initial backscatter signal from such an RFID device. This initial backscatter signal is detected during a first time period (e.g., before the product has been handled by a particular customer). The RFID interrogator then receives a subsequent backscatter signal from the RFID device at a later time/date. As described herein, the subsequent backscatter signal has a different amplitude due to a change in a resistance within an antenna wire in the RFID device. (As described herein, this change in the resistance is caused by movement of the product.) The price transmitter, in response to the subsequent backscatter signal having a predetermined amplitude (which may be higher or lower than the initial backscatter signal), presents the lower price to the customer. In one embodiment of the present invention, the subsequent backscatter signal having the predetermined amplitude is a prerequisite for presenting the lower price to the customer.

In an embodiment of the present invention, mechanical signals, rather than electrical signals, are used to quantify how much a product has been moved. For example, a weighted ball (e.g., the weighted object 705 in FIG. 7) can move freely through a sleeve (e.g., sleeve 708 in FIG. 7). Each time the product is turned upside-down (during a customer's inspection process), the weighted ball will strike a movement detector, such as a mechanical or electromechanical scale. A movement counter, attached to the scale, then counts how many times the weighted ball strikes the scale. If this count reaches a certain level (for a particular customer), indicating that the product has been examined and manipulated a certain number of times by a particular customer, then a reduced price is offered to that particular customer by the price transmitter 454.

In one embodiment of the present invention, the price reduction is for the particular product being examined by the customer. For example, product 404a may be a particular laptop computer. Thus, any price adjustment offered to that customer is limited to that particular laptop computer (or at least that brand/model).

In another embodiment of the present invention, the price reduction is for another product that has not been examined by the customer. For example, product 404a in FIG. 4 may be a laptop computer, and product 404b may be a tablet computer. Both a laptop computer and a tablet computer satisfy a same customer interest (e.g., browsing the World Wide Web, word processing, sending/receiving e-mail, watching videos, etc.). If the customer has performed a sufficient number of examinations of the laptop computer (i.e., by physically handling it as detected by the systems described herein), then that customer may be offered a special price on the tablet computer as well, thus providing the customer additional product options.

Figure 8:
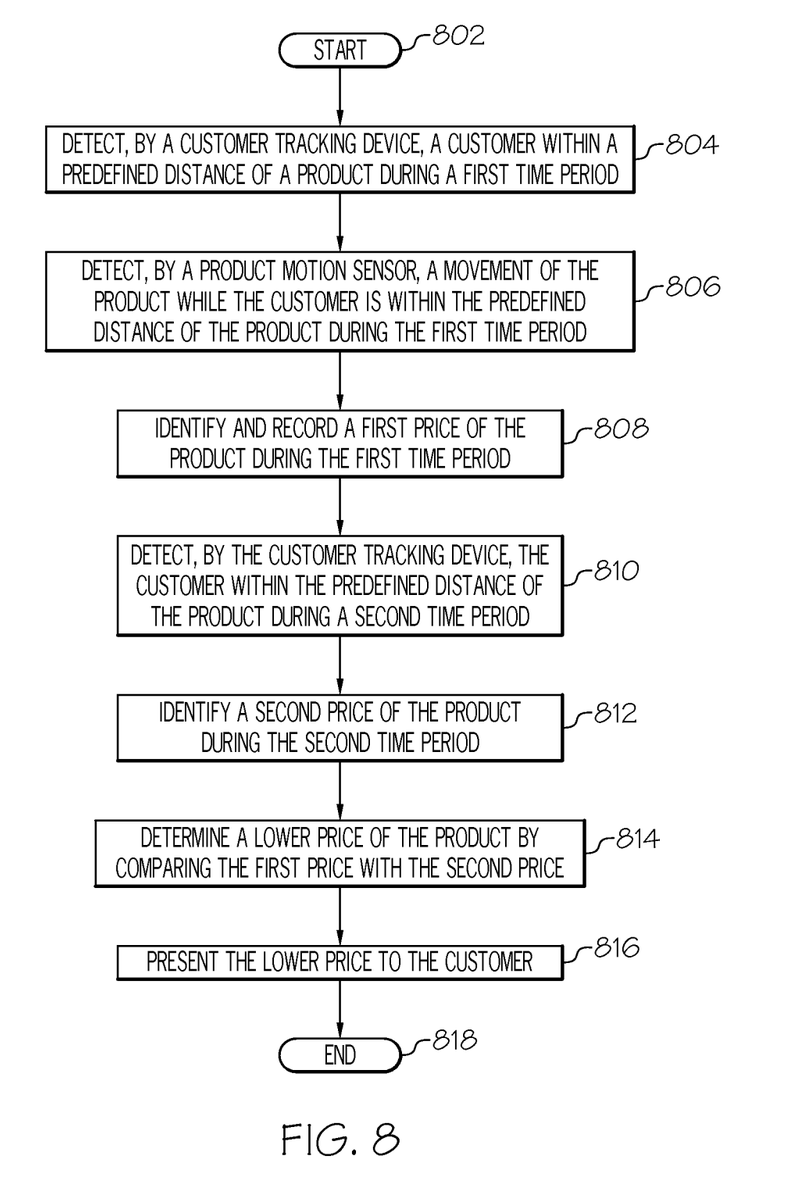
FIG. 8 is a high level flow-chart of one or more operations performed by one or more hardware devices to detect and manage customer interactions with a product being presented at a physical location.

With reference now to FIG. 8, a high level flow-chart of one or more operations performed by one or more hardware devices to detect and manage customer interactions with a product being presented at a physical location is presented. After initiator block 802, a customer tracking device (e.g., customer tracking device 252 in FIG. 2) detects a customer within a predefined distance of a product (e.g., product 204a) during a first time period, as described in block 804.

As described in block 806, a product motion sensor (e.g., one of the sensors 258a-258d in FIG. 2 or one of the sensors 358a-358d in FIG. 3) detects a movement of the product while the customer is within the predefined distance of the product during the first time period. For example, the product motion sensor will detect that a particular product is handled by a particular customer on a certain time/date.

As described in block 808, a product tracker (e.g., product tracker 260 in FIG. 2) then identifies and records a first price of the product during the first time period. For example, the product tracker 260 in FIG. 2 may have such information stored locally, or it may be retrieved from a remote server, or it may be part of an RFID that is affixed to the product, such as one of the RFIDs 458a-458d shown in FIG. 4.

As described in block 810, the customer tracking device then detects the customer within the predefined distance of the product during a second time period, where the second time period and the first time period are separated by a predefined amount of time. That is, the customer tracking device will detect that the particular customer, who was handling the product earlier, has returned and is again handling that same product at a later time/date.

As described in block 812, the product tracker then identifies a second price of the product during the second time period.

As described in block 814, the product tracker then determines a lower price of the product by comparing the first price with the second price.

As described in block 816, a price transmitter then transmits the lower price to the customer. In one or more embodiments this lower price is transmitted while the customer is within the predefined distance of the product during the second time period.

The flow-chart ends at terminator block 818.

In an embodiment of the present invention and as described herein, the product motion sensor is a backscatter passive radio frequency identification (RFID) device (e.g., RFID 558 in FIG. 5) affixed to the product, as described in FIG. 5-FIG. 7 above. An RFID interrogator (e.g., RFID interrogator 562 in FIG. 5) receives an initial backscatter signal (e.g., reactive signals 510 in FIG. 5) from the RFID device. The initial backscatter signal is detected during the first time period (e.g., when the customer is first looking at the product). The RFID interrogator receives a subsequent backscatter signal (also depicted as reactive signal 510 in FIG. 5) from the RFID device. The subsequent backscatter signal has a different amplitude due to a change in a resistance within an antenna in the RFID device. As described herein, the change in the resistance is caused by movement of the product. In response to the subsequent backscatter signal having a predetermined amplitude, a price transmitter presents the lower price to the customer. The subsequent backscatter signal having the predetermined amplitude is a prerequisite for presenting the lower price to the customer.

In an embodiment of the present invention, the product motion sensor is an optical sensor, and the product is initially positioned between an optical transmitter and an optical receiver to block an optical signal. The optical receiver detects the optical signal in response to the product being moved to clear an optical pathway between the optical transmitter and the optical receiver. Thus, each time this optical pathway is cleared and then reblocked, the system understands that the product has been picked up, examined, and then returned to the shelf.

In an embodiment of the present invention, the product motion sensor is a weight scale, and the product is initially positioned atop the weight scale. The weight scale detects a change in pressure in response to the product being moved from the weight scale, such that the change in pressure indicates the movement of the product. Thus, each time the scale detects the product being removed from the scale and then being placed back on the scale, the system understands that the product has been picked up, examined, and then returned to the shelf.

In an embodiment of the present invention, the product motion sensor detects the movement of the product while the customer is within the predefined distance of the product during the second time period, and detecting the movement of the product while the customer is within the predefined distance of the product during the second time period is a prerequisite for presenting the lower price to the customer. That is, only if the customer picks up and examines the product, and then returns at a later time to the same area where the product is located, will that customer be offered a special price on the product.

In an embodiment of the present invention, the product is a first product being presented at the physical location. The product tracker device determines that the first product and a second product satisfy a same customer interest. The customer tracking device detects the customer within a predefined distance of the second product during the first time period. The price transmitter presents a discounted price for the second product to the customer while the customer is within the predefined distance of the second product during the first time period. That is, if a first product (e.g., a laptop computer) and a second product (e.g., a tablet computer) meet the same needs of the user, then the system will offer the customer a special price on the tablet computer while the customer is handling the laptop computer.

In an embodiment of the present invention, the product is a first product being presented at the physical location. The product tracker (or other processors/systems) determines that the first product and a second product satisfy a same customer interest. The product tracker device detects the customer within a predefined distance of the second product during the second time period. The price transmitter then presents a discounted price for the second product to the customer while the customer is within the predefined distance of the second product during the second time period. That is, if a first product (e.g., a laptop computer) and a second product (e.g., a tablet computer) meet the same needs of the user, then the system will offer the customer a special price on the tablet computer only at a later time, at which time the customer goes to an area where the tablet computer is on display.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A system for detecting and managing customer interactions with a product being presented at a physical location, the system comprising:
  a customer tracking device, wherein the customer tracking device detects a customer within a predefined distance of a product during a first time period;
  a product motion sensor, wherein the product motion sensor detects a movement of the product while the customer is within the predefined distance of the product during the first time period, wherein the product motion sensor is a radio frequency identification (RFID) device, wherein the RFID device is a backscatter passive RFID device that is affixed to the product, wherein the RFID device comprises:
    an antenna;
    a variable resistor coupling the antenna to ground; and
    a weighted object within the variable resistor that moves in response to the product moving, wherein movement of the product causes the weighted object to move, wherein movement of the weighted object adjusts a resistance of the variable resistor, and wherein adjusting the resistance of the variable resistor causes the different amplitude of a subsequent backscatter signal during a second time period that is after the first time period, and wherein the change in the resistance is caused by movement of the product;
  an RFID interrogator, wherein the RFID interrogator receives an initial backscatter signal from the RFID device, wherein the initial backscatter signal is detected during the first time period, and wherein the RFID interrogator receives the subsequent backscatter signal from the RFID device during the second time period;
  one or more processors for identifying and recording a first price of the product during the first time period; wherein the customer tracking device further detects the customer within the predefined distance of the product during a second time period, wherein the second time period and the first time period are separated by a predefined amount of time; wherein said one or more processors further identify a second price of the product during the second time period; and wherein said one or more processors further determine a lower price of the product by comparing the first price with the second price; and
  a price transmitter, wherein the price transmitter transmits the lower price to the customer in response to determining the lower price of the product, and wherein the price transmitter, in response to the subsequent backscatter signal having a predetermined amplitude, presents the lower price to the customer, wherein the subsequent backscatter signal having the predetermined amplitude is a prerequisite for presenting the lower price to the customer.

2. The system of claim 1, wherein the RFID device comprises:
  an antenna head;
  a first antenna wire connected to the antenna head;
  a weighted object connected to the first antenna wire; and
  a second antenna wire connecting the weighted object to ground, wherein movement of the product causes the weighted object to stretch the first antenna wire to increase a resistance in the first antenna wire, wherein increasing the resistance in the first antenna wire causes the different amplitude of the subsequent backscatter signal.

3. The system of claim 1, wherein the product motion sensor further comprises a counter affixed to the product, and wherein the counter comprises:
  a movement detector, wherein the movement detector generates a mechanical signal in response to the movement of the product; and
  a movement counter, wherein the movement counter sums mechanical signals generated by the movement detector, wherein the price transmitter transmits the lower price to the customer in response to a sum of the mechanical signals reaching a predetermined limit.

4. The system of claim 1, wherein the product motion sensor further comprises a counter affixed to the product, and wherein the counter comprises:
  a movement detector, wherein the movement detector generates an electrical signal in response to the movement of the product; and
  a movement counter, wherein the movement counter sums electrical signals generated by the movement detector, wherein the price transmitter transmits the lower price to the customer in response to a sum of the electrical signals reaching a predetermined limit.

5. The system of claim 1, wherein the product motion sensor further comprises an optical sensor, wherein the optical sensor comprises:
  an optical transmitter; and
  an optical receiver, wherein the product is initially positioned between the optical transmitter and the optical receiver to block an optical signal, and wherein the optical receiver receives the optical signal in response to the product being moved to clear an optical pathway between the optical transmitter and the optical receiver.

6. The system of claim 1, wherein the product motion sensor further comprises a weight scale, wherein the product is initially positioned atop the weight scale, and wherein the weight scale detects a change in pressure in response to the product being moved from the weight scale.

7. The system of claim 1, wherein the product motion sensor detects the movement of the product while the customer is within the predefined distance of the product during the second time period, wherein detecting the movement of the product while the customer is within the predefined distance of the product during the second time period is a prerequisite for presenting the lower price to the customer.

8. The system of claim 1, wherein the product is a first product being presented at the physical location, wherein the one or more processors determine that the first product and a second product satisfy a same customer interest, wherein the customer tracking device detects the customer within a predefined distance of the second product during the second time period, and wherein the price transmitter presents a discounted price for the second product to the customer while the customer is within the predefined distance of the second product during the second time period.

9. A method of detecting and managing customer interactions with a product being presented at a physical location, the method comprising:
  detecting, by a customer tracking device, a customer within a predefined distance of a product during a first time period;
  detecting, by a product motion sensor, a movement of the product while the customer is within the predefined distance of the product during the first time period, wherein the movement includes the product being removed from and then returned to the display location, wherein the product motion sensor is a radio frequency identification (RFID) device, wherein the RFID device is a backscatter passive RFID device that is affixed to the product, wherein the RFID device comprises:
    an antenna head;
    a first antenna wire connected to the antenna head;
    a weighted object connected to the first antenna wire; and
    a second antenna wire connecting the weighted object to ground, wherein movement of the product causes the weighted object to stretch the first antenna wire to increase a resistance in the first antenna wire, wherein increasing the resistance in the first antenna wire causes the different amplitude of the subsequent backscatter signal during a second time period that is after the first time period;
  receiving by an RFID interrogator, an initial backscatter signal from the RFID device, wherein the initial backscatter signal is detected during the first time period;
  receiving, by the RFID interrogator, the subsequent backscatter signal from the RFID device, wherein the subsequent backscatter signal has a different amplitude due to a change in a resistance within the first antenna wire in the RFID device, and wherein the change in the resistance is caused by movement of the product;
  identifying and recording, by a product tracker device, a first price of the product during the first time period;
  detecting, by the customer tracking device, the customer within the predefined distance of the product during a second time period, wherein the second time period and the first time period are separated by a predefined amount of time;
  identifying, by the product tracker device, a second price of the product during the second time period;
  determining, by the product tracker device, a lower price of the product by comparing the first price with the second price; and
  presenting, by a price transmitter, the lower price to the customer, wherein the price transmitter, in response to the subsequent backscatter signal having a predetermined amplitude, presents the lower price to the customer, wherein the subsequent backscatter signal having the predetermined amplitude is a prerequisite for presenting the lower price to the customer.

10. The method of claim 9, wherein the product motion sensor further comprises an optical sensor, wherein the product is initially positioned between an optical transmitter and an optical receiver to block an optical signal, and wherein the method further comprises:
  detecting, by the optical receiver, the optical signal in response to the product being moved to clear an optical pathway between the optical transmitter and the optical receiver.

11. The method of claim 9, wherein the product motion sensor further comprises a weight scale, wherein the product is initially positioned atop the weight scale, and wherein the method further comprises:
  detecting, by the weight scale, a change in pressure in response to the product being moved from the weight scale, wherein the change in pressure indicates the movement of the product.

12. The method of claim 9, further comprising:
  detecting, by the product motion sensor, the movement of the product while the customer is within the predefined distance of the product during the second time period, wherein detecting the movement of the product while the customer is within the predefined distance of the product during the second time period is a prerequisite for presenting the lower price to the customer.

13. The method of claim 9, wherein the product is a first product being presented at the physical location, and wherein the method further comprises:
  determining, by the product tracker device, that the first product and a second product satisfy a same customer interest;
  detecting, by the customer tracking device, the customer within a predefined distance of the second product during the first time period; and
  presenting, by the price transmitter, a discounted price for the second product to the customer while the customer is within the predefined distance of the second product during the first time period.

14. The method of claim 9, wherein the product is a first product being presented at the physical location, and wherein the method further comprises:
  determining, by one or more processors, that the first product and a second product satisfy a same customer interest;
  detecting, by the product tracker device, the customer within a predefined distance of the second product during the second time period; and
  presenting, by the price transmitter, a discounted price for the second product to the customer while the customer is within the predefined distance of the second product during the second time period.

15. A computer program product for detecting and managing customer interactions with a product being presented at a physical location, the computer program product comprising a computer readable storage medium having program code embodied therewith, wherein the computer readable storage medium is not a transitory signal per se, and wherein the program code is readable and executable by a processor to perform a method comprising:
  receiving, from a customer tracking device, a message indicating that a customer is within a predefined distance of a product during a first time period;
  receiving, from a product motion sensor, a message describing a movement of the product while the customer is within the predefined distance of the product during the first time period, wherein the movement includes the product being removed from and then returned to a display location, wherein the product motion sensor is a radio frequency identification (RFID) device, wherein the RFID device is a backscatter passive RFID device that is affixed to the product, wherein the RFID device comprises:

an antenna head;

a first antenna wire connected to the antenna head;

a weighted object connected to the first antenna wire; and a second antenna wire connecting the weighted object to ground, wherein movement of the product causes the weighted object to stretch the first antenna wire to increase a resistance in the first antenna wire, wherein increasing the resistance in the first antenna wire causes the different amplitude of a subsequent backscatter signal during a second time period that is after the first time period;

receiving by an RFID interrogator, an initial backscatter signal from the RFID device, wherein the initial backscatter signal is detected during the first time period;

receiving, by the RFID interrogator, the subsequent backscatter signal from the RFID device during a second time period that is after the first time period, wherein the subsequent backscatter signal has a different amplitude due to a change in a resistance within the first antenna wire in the RFID device, and wherein the change in the resistance is caused by movement of the product;

recording a first price of the product during the first time period;

receiving, from the customer tracking device, a message indicating that the customer is within the predefined distance of the product during a second time period, wherein the second time period and the first time period are separated by a predefined amount of time;

identifying a second price of the product during the second time period;

determining a lower price of the product by comparing the first price with the second price; and presenting, to a price transmitter, the lower price, wherein the price transmitter transmits the lower price to the customer while the customer is within the predefined distance of the product during the second time period, wherein the price transmitter, in response to the subsequent backscatter signal having a predetermined amplitude, presents the lower price to the customer, wherein the subsequent backscatter signal having the predetermined amplitude is a prerequisite for presenting the lower price to the customer.

16. The computer program product of claim 15, wherein the product is a first product being presented at the physical location, and wherein the method further comprises:

determining that the first product and a second product satisfy a same customer interest;

receiving a signal, from the customer tracking device, indicating that the customer is within a predefined distance of the second product during the second time period; and sending, to the price transmitter, a discounted price for the second product, wherein the price transmitter transmits the discounted price to the customer while the customer is within the predefined distance of the second product during the second time period.

* * * * *